United States Patent [19]

Ohhashi et al.

[11] Patent Number: 4,548,592
[45] Date of Patent: Oct. 22, 1985

[54] PULLEY CONSTRUCTION

[75] Inventors: Yasuo Ohhashi; Junichi Araki; Yoshihiro Katsui, all of Saitama, Japan

[73] Assignee: Honda Giken Kogyo Kabushiki Kaisha, Tokyo, Japan

[21] Appl. No.: 452,763

[22] Filed: Dec. 23, 1982

[30] Foreign Application Priority Data

Dec. 24, 1981 [JP] Japan .................................. 56-212710
Dec. 24, 1981 [JP] Japan .................................. 56-212711

[51] Int. Cl.⁴ .............................................. F16H 55/49
[52] U.S. Cl. ..................................... 474/168; 474/170; 474/177; 474/178; 474/190
[58] Field of Search ................ 474/169, 168, 177, 178, 474/190, 191, 170, 171

[56] References Cited

U.S. PATENT DOCUMENTS

| 1,792,733 | 2/1931 | De Wein | 474/178 X |
| 2,806,379 | 9/1957 | Haracz | 474/191 |
| 3,772,928 | 11/1973 | Gobeille | 474/170 |
| 4,031,761 | 6/1977 | Fisher et al. | 474/170 X |
| 4,037,486 | 7/1977 | Schultz, Jr. | 474/169 |
| 4,366,609 | 1/1983 | Speer | 474/177 X |

FOREIGN PATENT DOCUMENTS

| 944159 | 6/1956 | Fed. Rep. of Germany | 474/170 |
| 752842 | 7/1956 | United Kingdom | 474/191 |

Primary Examiner—James A. Leppink
Assistant Examiner—Frank H. McKenzie, Jr.
Attorney, Agent, or Firm—Lyon & Lyon

[57] ABSTRACT

A pulley, composite in nature, including a fabricated wheel defining a rim channel into which a ring is positioned. The ring is rigidly held within the channel by tabs and interlocking arrangements. The ring is designed to include any one of a number of pulley gripping surfaces such as teeth and V grooves.

16 Claims, 4 Drawing Figures

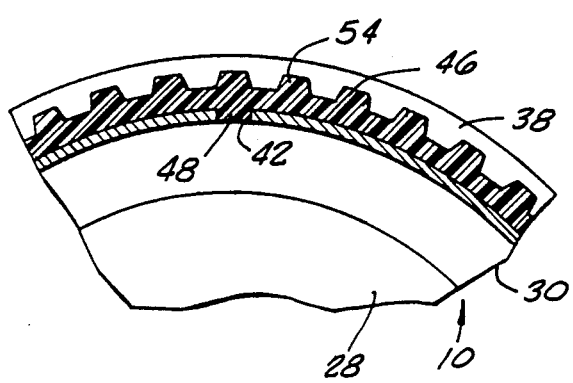
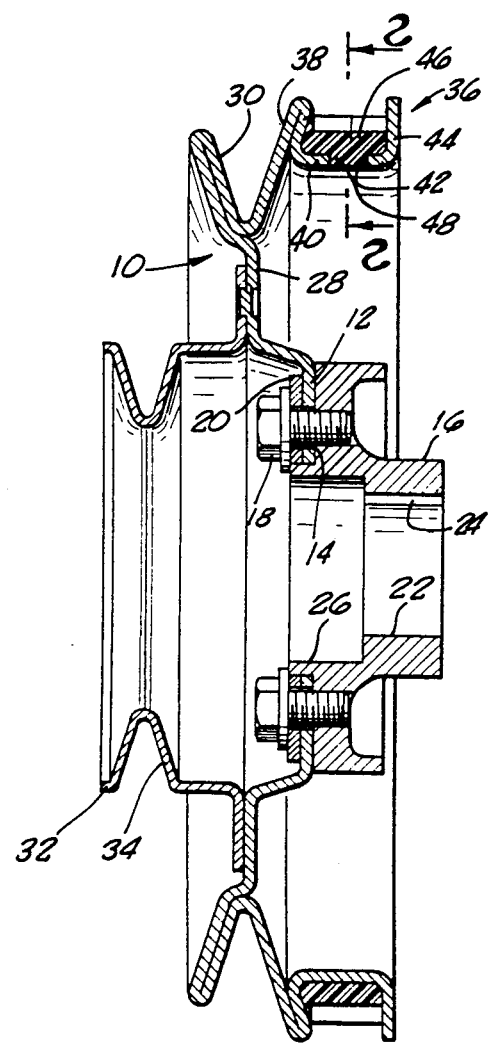

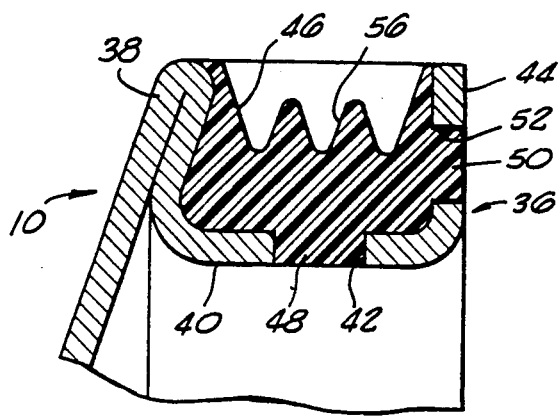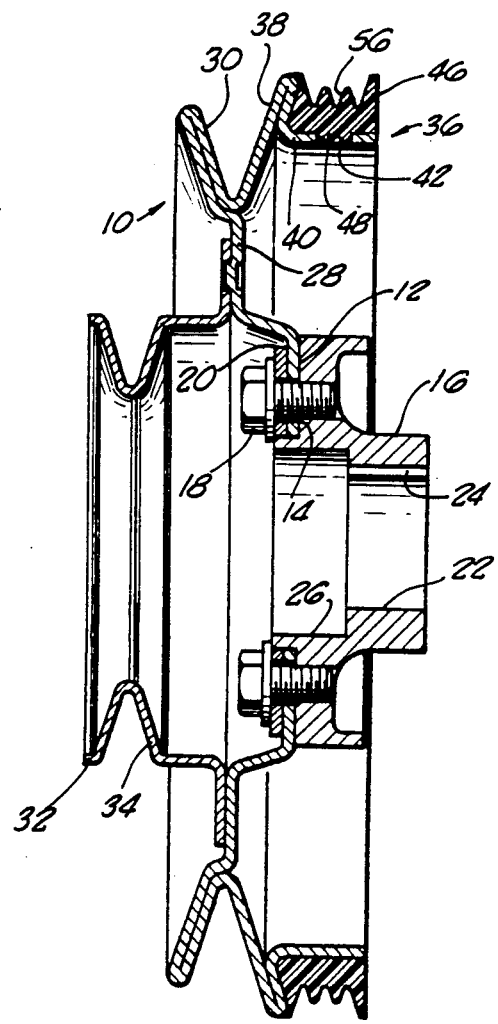

PULLEY CONSTRUCTION

BACKGROUND OF THE INVENTION

The field of the present invention is pulleys and the construction thereof. Pulleys of the present invention have particular applicability for auxiliary equipment belts on automotive engines.

Pulleys for auxiliary equipment on automotive applications are subjected to a substantial amount of stress resulting from the loads which are to be driven as well as the rapid acceleration and deceleration associated with such engines. At the same time, such pulleys and the belts therefor are expected to endure such use over long periods of time. Thus, the environment in which such pulleys are to be employed is quite demanding, particularly on the belts associated with such pulleys. As a result, it is advantageous to provide pulleys wherein the rims are fairly accurately made. In this way, belt life may be increased. It is additionally advantageous to have auxiliary equipment pulleys for such uses to be as light in weight as possible. The lighter the pulley, the lighter the inertial mass which must be rotationally accelerated or decelerated and the lighter the overall engine assembly.

The foregoing requirements would suggest a relatively expensive pulley construction, light in weight and accurately fabricated. However, for automotive purposes, high production and low cost is mandatory. As a result, prior pulley design has been a compromise between optimum design and low cost.

SUMMARY OF THE INVENTION

The present invention is directed to a pulley of composite construction formed from a pulley wheel and a cylindrical ring positioned in the rim. The cylindrical ring is locked in place in the rim and provides an accurate pulley surface which may take on any desired form. In the preferred embodiments, a multiple V groove arrangement and a toothed wheel arrangement are disclosed.

The composite nature of the wheel of the present invention provides an accurate, low cost and lightweight design. The resilient insert may be molded in situ or fabricated by other conventional techniques to give an accurate and resilient pulley surface for receipt of an appropriately configured belt. The nature of the preferred material, synthetic resin polymer or plastic, also adds to the longevity of the system. In certain cases, the belt tension may be reduced to extend both belt life and bearing life. The rings are also configured to remain on the pulley wheel in spite of repeated compressional and torsional loading during operation. This arrangement is generally accomplished by the employment of tabs on the liner extending into holes on the wheel. Additionally, one wall of the wheel is oriented relative to the bottom of the rim to provide an undercut arrangement resisting radial movement of the liner.

Accordingly, it is a principal object of the present invention to provide an improved pulley structure for auxiliary equipment on automotive uses. Other and further objects and advantages will appear hereinafter.

BRIEF DESCRIPTION OF THE DRAWINGS

FIG. 1 is a cross sectional side view of a pulley of the present invention.

FIG. 2 is a fragment of a pulley illustrated in cross section taken along line 2—2 of FIG. 1.

FIG. 3 is an alternate embodiment illustrated in cross-sectional side elevation.

FIG. 4 is a detail of the rim of yet another embodiment illustrated in cross-sectional elevation.

DETAILED DESCRIPTION OF THE PREFERRED EMBODIMENT

Turning in detail to the drawings and particularly FIGS. 1 and 2, a pulley of the present invention defining a toothed wheel is disclosed. The pulley includes a wheel, generally identified as 10 which is formed from sheet material, preferably steel. The wheel 10 includes an inner attachment flange 12 having holes 14 for attachment to a hub 16. Fasteners 18 and a gasket 20 are employed in combination with the holes 14 to mount the wheel 10 to the hub 16. The hub 16 has a central bore 22 with a keyway 24 for receipt of a power shaft or idler shaft fixed to the automotive engine or auxiliary equipment. A bore 26 of larger diameter is disposed within the hub 16 for receipt of a nut or other fastening means to fix the hub 16 to the shaft.

Returning to the wheel 10, a web 28 extends outwardly from the inner attachment flange 12. This web 28 is shown to have dished sections for added strength and proper location of the rims. The web 28 extends outwardly to an intermediate annular V groove 30. This groove also adds strength to the wheel and provides a location for the positioning of a V belt for driving additional auxiliary equipment. Fixed to the web 28 by spotwelding or the like is an additional pulley wheel 32. This pulley wheel 32 also includes a groove 34 for a V belt.

Outwardly of the web 28 is a rim 36. The rim 36 is formed from the sheet material and includes an outwardly extending annular wall 38. This wall 38 is formed from two thicknesses of the sheet material as can best be seen in FIG. 1. The wall is inclined from the radial direction and extends downwardly about a radiused curve to a cylindrical rim member 40. The cylindrical rim member 40 extends in the axial direction of the wheel and is located directly above the hub 16. Thus, the rim member 40 and the annular wall 38 form an acute angle therebetween. As can best be seen in FIG. 1, this formation of an acute angle defines an undercut area as viewed in the radial direction. The provision of this undercut area enables the rim 36 to better retain the insert discussed below. The cylindrical rim member itself includes a number of holes 42 extending therethrough. These holes 42 are advantageously positioned rather uniformly about the rim member.

To this point in the detailed description, the disclosure has applied equally to each of the embodiments. Consequently, identical reference numbers have been applied to each of the embodiments. However, a first variation now appears. Comparing FIGS. 1 and 3, it can be noted that a flange 44 is employed in the embodiment of FIG. 1 and is absent from the embodiment of FIG. 3. This flange 44 is spaced from the wall 38 and extends outwardly from the cylindrical rim member 40 in a radial direction. Thus, a channel is formed by the wall 38, the flange 44 and the cylindrical rim member 40. The flange 44 is employed to retain the belt and may also help to retain the ring described below. The flange 44 is also employed in the embodiment of FIG. 4.

Positioned about the cylindrical rim member 40 adjacent the outwardly extending annular wall 38 is a cylindrical ring 46. The ring 46 is typically to be of synthetic resin polymer or a plastic material and may take on a variety of shapes as will be discussed with each embodiment. The ring 46 includes tabs 48 which extend into the holes 42 located through the cylindrical rim member 40. The tabs 48 thus cooperate with the undercut area as defined by the annular wall 38 to fixedly retain the ring in place. To retain the ring in place it is necessary to prevent movement of the liner in a rotational manner about the wheel 10, to prevent the liner from moving axially on the wheel 10 and to prevent centrifugal force from allowing the liner 46 to expand outwardly. Each of these possible movements is restricted by the combination of the annular wall 38 and the tabs 48 positioned in the holes 42. As noted above, in the embodiments FIGS. 1, 2 and 4, the radial flange 44 also cooperates to retain the ring 46. As an additional means to that end, a tab 50 on the side of the ring 46 extends to holes 52 located through the radial flange 44. In this way, additional retention capacity is realized.

On the outer surface of the ring 46 the pulley surface is formed. The pulley surface includes, in each embodiment, some means for increasing the mechanical purchase of a compatible belt on the pulley. In the case of the embodiments of FIGS. 1 and 2, outwardly disposed teeth 54 are uniformly positioned about the pulley. These teeth 54 extend parallel to the axis of the wheel and interface with teeth provided on the inside of a pulley belt. Naturally, any pitch and tooth configuration may be employed. In the embodiments of FIGS. 3 and 4, multiple V grooves 56 are provided for receipt of a single belt having multiple V ridges or multiple V belts.

The positioning of the mechanical means defined in the pulley surface is such that the outwardly extending annular wall 38 and the flange 44 extend outwardly beyond the teeth or grooves of the ring. In this way, the belt or belts can be retained on the pulley even with a substantial amount of slack in the belt. The ring itself may extend outwardly to the periphery of both the annular wall 38 and the flange 44 where present. This extension or extensions of the liner are generally outwardly of the mechanical means for gripping the intended belt. In the case of the embodiment of FIG. 3, this extension also forms the sidewall of the pulley in place of the flange 44.

Albeit many techniques are available for placement of the ring 46 in position, one technique which may find substantial advantage is to simply form the ring 46 in situ. Under such circumstances, a great variety of pulley surfaces become available.

Accordingly, an improved pulley has been disclosed designed primarily for auxiliary equipment drives for automotive purposes. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A pulley of composite construction, comprising
    a wheel having an inner attachment flange, a rim and a web extending between said inner attachment flange and said rim, said rim including a first outwardly extending annular wall formed of sheet material and a cylindrical rim member formed of sheet material, said first annular wall forming an acute angle with said cylindrical rim member and said cylindrical rim member including first holes therethrough; and
    a cylindrical ring adjacent said first annular wall and about said rim member, said ring including a pulley surface having mechanical means for increasing purchase thereon and first tabs extending into said first holes in said rim member.

2. The pulley of claim 1 wherein said rim further includes a radially extending flange formed of sheet material extending outwardly from said cylindrical rim member and spaced from said first annular wall to form a channel with said wall and said rim member, said cylindrical ring being positioned within said channel.

3. The pulley of claim 2 wherein said radially extending flange includes second holes therethrough and said cylindrical ring includes second tabs extending into said second holes.

4. The pulley of claim 1 wherein said cylindrical ring is moulded in situ about said rim member.

5. The pulley of claim 1 wherein said mechanical means include outwardly disposed teeth extending parallel to the axis of said wheel.

6. The pulley of claim 1 wherein said mechanical means includes at least one V groove extending about said cylindrical ring.

7. The pulley of claim 1 wherein said annular wall extends outwardly further than said mechanical means of said pulley surface.

8. The pulley of claim 1 further comprising a hub fixed to said inner attachment flange.

9. The pulley of claim 1 wherein said cylindrical ring is a synthetic resin polymer.

10. The pulley of claim 1 wherein said ring is plastic.

11. The pulley of claim 1 wherein said wheel is all formed from sheet material.

12. A pulley of composite construction, comprising
    a wheel having an inner attachment flange, a rim and a web extending between said inner attachment flange and said rim, said web forming an annular V-groove first pulley surface having a first outwardly extending annular wall and a cylindrical rim member, said first annular wall forming an acute angle with said cylindrical rim member to define an undercut area relative to a radial plane and said cylindrical rim member including first holes therethrough; and
    a cylindrical ring adjacent said first annular wall, in said undercut area and about said rim member, said ring including a second pulley surface having mechanical means for increasing purchase thereon, first tabs extending into said first holes in said rim member, and a first sidewall extending upwardly in juxtaposition with said first annular wall and extending outwardly beyond said mechanical means.

13. The pulley of claim 12 wherein said cylindrical ring further includes a second sidewall spaced from said first sidewall with said mechanical means therebetween, said second sidewall extending outwardly beyond said mechanical means.

14. The pulley of claim 13 wherein said rim further includes a radially extending flange in juxtaposition with said second sidewall and fixed to said cylindrical rim member, said flange including second holes therethrough and said cylindrical ring including second tabs extending into said second holes in said radially extending flange.

15. The pulley of claim 12 wherein said first outwardly extending annular wall forms one side of said V-groove first pulley surface and one side of said second pulley surface.

16. The pulley of claim 15 wherein said first outstanding extending annular wall is formed of two thicknesses of sheet metal.

* * * * *